Jan. 3, 1950  P. H. MacMAHON  2,493,491
ELECTRIC LAMP
Filed Aug. 2, 1946  2 Sheets-Sheet 1
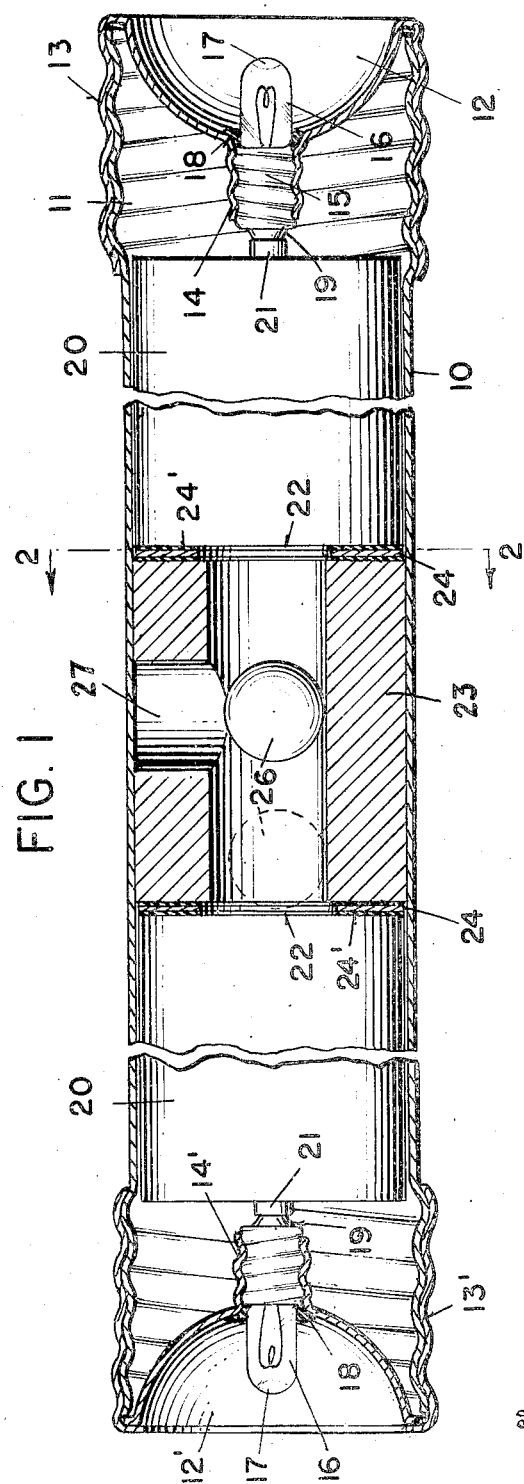
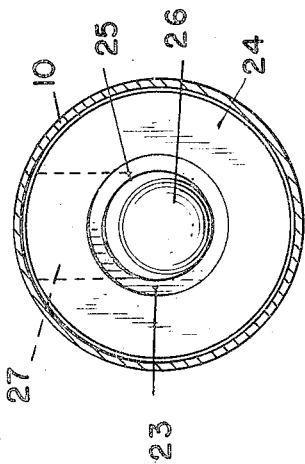
Inventor
Paul H. MacMahon,
By Bacon + Thomas
Attorney Jan. 3, 1950 P. H. MacMAHON 2,493,491
ELECTRIC LAMP Filed Aug. 2, 1946 2 Sheets-Sheet 2

Inventor
Paul H. MacMahon,
By Bacon & Thomas
Attorney

Patented Jan. 3, 1950

2,493,491

UNITED STATES PATENT OFFICE 2,493,491

ELECTRIC LAMP

Paul H. MacMahon, Alexandria, Va.

Application August 2, 1946, Serial No. 687,868

4 Claims. (Cl. 240—10.6)

My invention relates to electric lamps.

My invention relates more particularly to battery operated electric lamps of the flash-light type having means operable at will for closing and opening the circuit between the battery and the filament lamp bulbs.

My invention relates still more particularly to an electric lamp of the above-mentioned flashlight type having two spaced and oppositely directed filament lamp bulbs for illuminating and/or signalling in opposite directions, with dry cells for current supply, in a single casing convenient for hand support and manipulation or for attachment to a bicycle or other pedal operated vehicle.

My invention also relates to signal lights for bicycles and other pedal-operated cycles as an attachment to a pedal of the cycle and operable for the flashing on and off of the lights as the pedal is revolved by the cyclist.

Disadvantages commonly found in prior electric lamps of the above-mentioned classes are the housing of the lamp bulbs, the battery and circuit connections in a casing having a considerable number of interfitted parts and the employment of extensive, and in many instances, complicated circuit wiring and movable contact elements for making and breaking the circuit. The consequent liability to disarrangement of parts and impairment of function after a comparatively short period of use are serious disadvantages in any such flash lights whether designed merely for hand manipulation or not, and particularly so for one designed for use as an attachment to and for movement with the pedal of a bicycle or the like. In the last-mentioned use, the flash light is subjected to considerable strains, and especially so where, as in the usual pedal-attached flash light, the movable contact element for making and breaking the circuit from the battery through the lamp bulb is operated by the foot of the cyclist.

Consequently, a primary object of my invention is to provide a flash light which may be employed either as a flash light for hand transportation and use or as a pedal-attached flash light on a bicycle or other pedal-operated vehicle, and which in either use will be free from the above-mentioned disadvantages of such prior flash lights.

To the end of overcoming or avoiding the above-mentioned defects in prior electric lamps of the flash light type, and provide an efficient and durable flash light for all purposes for which such a device may be used, and particularly to provide one which may be efficiently used over a prolonged period of time as a pedal-attached signal light for bicycles and other pedal-operated vehicles, the flash light of my invention presents at least three important general principles of structure and functioning: (1) in forming the circuit between the battery and the lamp bulbs without any circuit wiring at all; (2) in employing as the housing or outer casing of the device as a whole a tubular shell of one piece structurally between its end caps which contain the lamp bulbs; and (3) in provision for the making and breaking of the circuit from the battery to the lamp bulbs, and consequently flashing on and off of the lights, by a structural element wholly within the outer casing of the device actuated by movement or change in rate or direction of movement imparted to the flash light as a whole or change in body position of the flash light.

One or two or all three of these principles may be employed with advantage in different embodiments of the invention.

Also, the structural and operative principles of the invention are applicable to a flash light with the usual lamp filament bulb at one end only as well as with such a bulb at both of the opposite ends of the device and whether the device is employed as a hand carried and manipulated flash light or as a pedal-attachment on a bicycle or other pedal-operated vehicle.

The foregoing principles and other principles, and the details of mechanical structure and functioning of my invention more fully appear from a preferred embodiment of the invention as hereinafter described and shown in the accompanying drawings forming a part of the specification. It is to be understood, however, that that embodiment of the invention is merely an exemplary one and that changes and modifications may be made therein within the scope of the appended claims.

In the accompanying drawings:

Fig. 1 is a longitudinal sectional view of the flash light device as a whole with certain parts shown in side elevation;

Fig. 2 is a transverse sectional view through the flash light on the line 2—2 of Fig. 1, the section being taken through one of the spring-expansion washers employed in the assembled flash light;

Fig. 3 is an edge elevational view of the washer;

Figure 4:
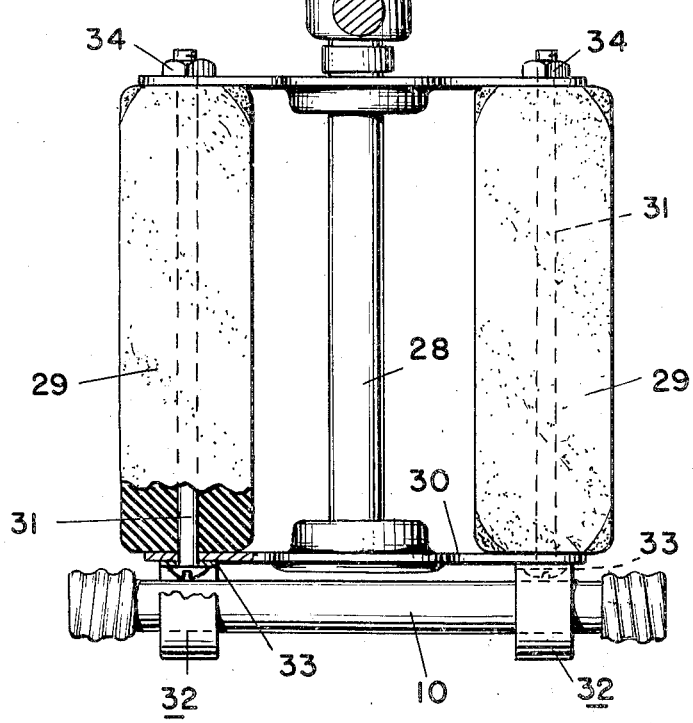
Fig. 4 is a top plan view of a pedal of a bicycle with the flash light attached thereto.

Referring now to the preferred embodiment of my invention as illustrated in the accompanying drawings, a tubular outer shell or casing, preferably of cylindrical cross-section, and of one-piece structurally from end to end, is employed as shown at 10 in Figs. 1 and 2. That shell or casing is preferably constructed entirely of metal or other electrical conducting material. It may, however, be constructed of non-conducting material, such as any of the usual types of plastics employed for flash-light casings, and in which case, a strip of electrical conducting material may be embedded in the wall of the casing to present a surface exposure flush with the interior cylindrical wall of the tube and extending the entire length thereof.

The two opposite end portions of the tubular casing 10 are exteriorly threaded, as shown at 11 in Fig. 1 for the reception of interiorly threaded ring-shaped or annular head caps containing the filament lamp bulbs.

Preferably, the head caps employed at both ends of the casing are each a one-piece machined head cap having a chromed or nickel reflector, without a front lens, but carrying a filament lamp bulb having its own lens at the end of the bulb, such, for example, as the well-known General Electric Company flash-light bulb known as the "Lens End" bulb.

Such an assembly of one-piece head cap and reflector and supported lamp bulb is shown on the right hand end of the casing in Fig. 1, the member having the reflector on its outer face being indicated at 12 and the main body portion of the cap being indicated at 13, the latter being interiorly threaded to screw over the exterior threads on the adjacent end portion of the casing.

The member 12 having the reflector surface on its forward face, has a sleeve-like rear extension 14 which is interiorly threaded to receive through the sleeve the exteriorly threaded socket 15 of the lamp bulb, the filament of the bulb being shown at 16 and the built-in lens at the forward end or top of the glass bulb being shown at 17.

With such a "Lens-End" lamp bulb the usual lens, and as usually mounted in the outer end of the head cap, is dispensed with, a rubber gasket being employed in the forward thread on the socket of the lamp bulb, as shown at 18 in Fig. 1, to provide the weather-proofing usually provided for by a lens in the outer open end of the head cap.

As is customary, one end of the filament of the lamp bulb is connected to the metal socket 15 of the bulb, thus providing a peripheral terminal in direct electrical contact with the metal of the reflector member 14 which carries that socket, while the other end of the filament is connected to a central terminal 19 extending rearwardly from the socket of the bulb.

As stated, the same construction of one-piece head cap and reflector member with the latter supporting the lamp-bulb, as shown at the right-hand end of the outer casing of the device in Fig. 1, is preferably employed at the opposite end of that casing. However, a two-piece head closure and support for the lamp bulb may be employed at either or both ends of the casing, as illustrated at the left-hand end of the casing on Fig. 1.

In the last-mentioned arrangement, the reflector member, indicated at 12', is separate from the ring-shaped cap member 13', instead of being integral therewith, as in the case of the members 12 and 13 of the head closure at the right end of the tube. Otherwise, however, the structures are substantially the same, the reflector member 12' at the left in Fig. 1 having an interiorly threaded and rearwardly extending sleeve 14' for reception therethrough of the exteriorly threaded metal socket 15 of the lamp bulb.

When the flash light is designed for use with a lamp bulb at both ends, as in the illustrated embodiment of the invention, two compartments are provided within the outer tubular shell or casing, each to contain a source of electrical current, such as a dry cell, as indicated at 20 in Fig. 1, although a plurality of such cells in each compartment may be employed, if desired.

However, whether one battery element, such as the dry cell 20, is employed in each of the two compartments of the device or a plurality, the operating principle is the same. Each dry cell 20, being of the usual type, has a cylindrical side wall of electrical non-conducting material, or if not, is coated with such material so as to be insulated from the metallic outer casing.

Also, as in the usual dry cell customarily employed in flash lights, the cell 20 in each of the two compartments of my flash light has a projecting positive terminal 21 which, in the assembled condition of the flash light, is in direct electrical contact with the central terminal 19 of the lamp bulb, the opposite metallic face of the cell, indicated at 22, being its negative terminal.

Thus, the negative terminals 22 of the two dry cells are in opposed spaced relation. And, between those opposed negative terminals of the dry cells, a partition member 23 is provided in the outer shell or casing of the device, the partition member being in the form of a block or plug of steel or other electrical conducting material of outer peripheral contour corresponding with that of the inner wall of the outer shell of the flash light and in direct electrical contact with that wall, in case the outer shell is made entirely of metal or other electrical conducting material, as preferred, or in direct electrical contact with the metallic or other electrical conducting strip embedded in that wall in case the shell is not made entirely of metal or the like conducting material.

A ring-shaped or annular washer 24 coated with insulating material, such as rubber, as indicated at 24', is provided between the opposite end faces of the steel block 23 and the adjacent metal bases of the dry cells 20 constituting their negative terminals, so that with the arrangement of parts as thus far described, the negative terminals of the battery elements 20 are out of electrical contact or connection with the metal wall of the outer shell of the device.

As means for intermittently completing and breaking the circuit from the opposed battery elements to the lamp bulbs at the opposite ends of the flash light device, the steel plug 23 is centrally bored in the longitudinal axial line of the outer shell of the device, with the bore of circular cross-section as shown at 25 in Figs. 1 and 2; and a steel ball 26 of substantially lesser diameter than the width of the bore in the plug 23 is disposed in that bore.

Thus, the steel plug 23, with its axial bore 25, forms a runway for the rolling movement of the steel ball 26 alternately in opposite directions along that runway into contact with the opposed negative terminals of the two cells 20 in alternation upon such change in the body position or movement of the flash light as a whole as would cause such rolling movement of the ball. And, upon contact of the steel ball with the negative terminal of either one of the battery elements 20, the current from that battery element through the adjacent lamp bulb would be completely by way of closing the theretofore only open portion of the circuit, namely, between the negative terminal of the battery element 20 and the metal wall of the outer shell 10 of the flash light.

The current path then would be from the positive terminal 21 of the dry cell 20 (whose negative terminal was contacted by the steel ball), to the central terminal 19 of the adjacent lamp bulb, through the filament to the peripheral terminal in the metal socket 15 of that bulb, through the reflector member 14 carrying the socket, the body portion 13 of the head cap, the metal wall of the outer shell of the flash light, the steel plug 23, the ball 26 in constant contact with the lower runway surface of the axial bore of that plug, and to the negative terminal of the battery element contacted by that ball.

To avoid contact of the steel ball 26 with an inner edge portion of the washer 24, and thereby provide for unrestrained rolling movements of the ball into full contact with the negative terminals of the battery elements 20 in alternation, the center aperture of the washer 24 is made of substantially larger diameter than that of the axial bore 25 in the steel plug 23, as shown in Fig. 2.

Thus, the steel ball 26 and the steel plug 23 with its axial bore 25 forming a runway for that ball, constitute means for making and breaking the circuits for supplying current to the lamps; and, as a part of that means, the steel ball 26 constitutes a movable switch or contact member for making and breaking the electrical connection between the negative terminals of the battery elements and the metal wall of the outer shell or casing of the device.

In order to avoid lighting of the lamp bulbs and consumption of current in periods of unintended use of the flash light, means are provided for locking the movable contact element, i. e., the steel ball 26, from movement in the runway of the steel plug. In the present illustrative embodiment of the invention, that means takes the simple form of a transverse bore 27 through one side wall of the steel plug 23, large enough to receive the steel ball 26.

Thus, the interior curvilinear surface of the axial bore 25 of the steel plug 23 on the side of that axial bore diametrically opposite the side containing the transverse bore 27 becomes the only operative runway for the steel ball 26, and then only when the flash light body as a whole is so disposed that that runway becomes the lowermost interior surface of the steel plug 23. That operative position of the flash light is shown in Fig. 1; and all that is required for rendering the flash light inoperative by locking the ball 26 from rolling movement in the axial bore of the steel plug 23 is to turn the flash light body as a whole over sidewise 180 degrees to dispose the side wall of the steel plug 23 containing the transverse bore 27 lowermost, whereupon the steel ball 26 will readily drop into the transverse bore 27 in the steel plug 23 and be thereby restrained from rolling movement in the runway until the flash light body as a whole is restored to its first-mentioned position, as shown in Fig. 1.

In assembling the various parts of the flash light, it is highly advantageous to have a close and firm electrical contact between the positive terminals of the dry cells 20 and the central terminal of the lamp bulbs. To that end, the hereinbefore mentioned ring-shaped washers 24 are preferably of the expansive-metal type. In other words, when not under compression, the washers 24 are each of bow-shape, as shown in Fig. 3; and when compressed into a straight-lined plane, as they are in the assembled flash-light, they exert a continuous pressure in the direction tending to restore them to their bowed form.

In order to render those metal expansion-spring washers 24 electrically non-conductive, they are coated with insulating material as hereinbefore mentioned. To that end, they may be dipped in latex or covered with paper or painted with a non-conductive paint.

The center steel plug 23 is preferably spot-welded to the interior wall of the outer metal shell 10 of the device. And with the open-ended shell 10 thus equipped with the center steel plug 23, the end portions of the device on opposite sides of the center steel plug are assembled. For each such end portion, the washer 24 is first inserted in the open end of the outer shell of the device against the proximate end face of the steel plug and with the washer bowed outwardly away from the plug toward the open end of the shell. Next, the dry cell 20 is inserted with its base plate (negative terminal) against the outwardly bowed face of the washer.

Then, in case the one-piece head cap, shown at the right hand end of Fig. 1 is used, the lamp-bulb is inserted in the reflector member 12 and the socket of the bulb screwed home within the internally threaded sleeve 14 of the reflector member. The interiorly threaded body 13 of the head cap with the contained lamp bulb is then screwed down to its limit on the exteriorly threaded end portion of the outer shell of the device, thus forcibly pressing the central terminal 19 on the socket of the lamp bulb against the positive terminal 21 of the dry cell 20 and forcing that dry cell in turn downwardly against the outwardly bowed face of the washer 24 until the washer assumes its flat form, and in which condition that washer exerts a constant outward pressure maintaining the positive terminal 21 of the dry cell 20 in close and secure electrical contact with the central terminal in the socket of the lamp bulb.

One end portion of the flash-light having been thus assembled, the steel ball 26 is inserted through the opposite open end of the tube into the runway of the steel plug 23, and the assembly of the other end portion of the device is proceeded with.

In case a one-piece head cap and reflector like that shown at the right hand end of the outer shell of the device is used also for the opposite end of the shell, the above assembly procedure is repeated. And, in case a two-piece reflector and ring-shaped head cap are used, as shown at 12' and 13' at the left-hand end of the shell in Figure 1, the assembly procedure is the same except that the reflector member 12' with the lamp-bulb inserted therein, is placed in the open end of the shell and the interiorly threaded ring-shaped head cap 13' is then screwed down over the exterior threaded end portion of the shell.

As thus described and illustrated in the drawings, the flash light of my invention is adapted for use as a hand flashlight; and may be manually operated in several different ways. For example, for hand operation, the flash light body as a whole may be pivotally moved in the downward and upward direction with respect to the horizontal about an axis transverse to the body of the light, and such body movement of the device will cause the ball 26 to roll along its runway into circuit making and breaking contacts with the negative terminals of the dry cells in alternation (assuming, of course, that the flash light is positioned in the hand so as to dispose the imperforate runway lowermost, as shown in Fig. 1).

Also, the same circuit making and breaking movements of the ball in its runway may be had with the flash light held in substantially horizontal position and bodily moving it in opposite directions longitudinally of the flash light, or by swinging the flash light bodily in a curvilinear path or in a complete circle while holding it in substantially horizontal position. In all those instances, the change in body position or bodily movement or change in direction of movement of the flash light will cause the ball to roll in its runway into circuit-making and circuit-breaking contacts with the negative terminals of the dry cells in alternation.

Obviously, also, the same results, except for flashing on and off of only one light at one end of the tube instead of two at the opposite ends would occur from the same manipulations of the device, if only one lamp bulb was in operative position, or if the device was designed as a single instead of a double flash light as now shown. In the latter case, for example, the structure could consist only of that portion of the flash light of Fig. 1 which includes the steel plug with its runway and ball and extends therefrom to one end only of the device.

Figure 5:
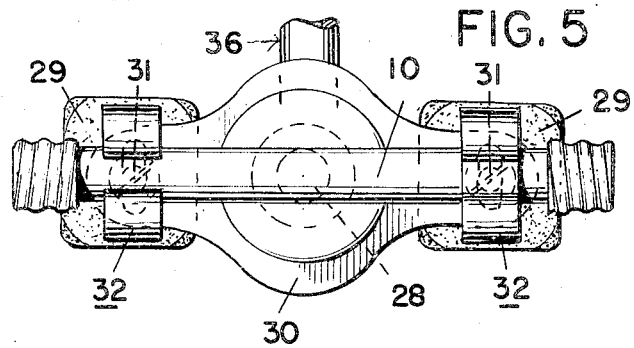
Fig. 5 is an end elevation view of the pedal with the flash light device attached thereto.

To adapt the hereinbefore described flash light of my invention to a bicycle on which it may be carried and automatically operated with the movement of the bicycle and to the same effect as hereinbefore described for its hand manipulation, all that is needed is to so clamp the device on the pedal of the bicycle as to dispose it transversely of the foot treads of the pedal and consequently in substantial parallelism with the line of travel of the bicycle, and in substantially horizontal position throughout the cycles of revolution of the pedal, as illustrated in Figs. 4 and 5.

In Fig. 4, the central spindle of the pedal is indicated at 28, and the foot treads on opposite sides of and revolving about the spindle are indicated at 29.

Figure 6:
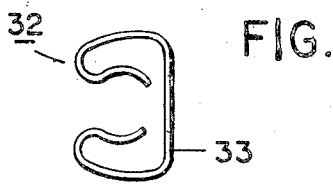
Fig. 6 is a side or edge elevation view of one of the two clamps employed in attaching the flash light to the pedal of the bicycle.

As a convenient means of attaching the flash light to the foot pedal (generally the left pedal looking toward the front of the bicycle) two clamps 32 as indicated in Fig. 4, and such as shown in side elevation view in Fig. 6, are employed, with the clamp secured to the outer frame member 30 of the pedal by extending the rods 31 of the foot treads 29 through the outer frame member 30 of the pedal and through slots in the base portion 33 of the clamps, and then securing the clamps by nuts 34 on the inner ends of the rods 31, as shown in Fig. 4.

Fig. 4 shows the flash light of Fig. 1, indicated at 10 in Fig. 4, secured in the clamps 32 transversely of the treads of the bicycle pedal and longitudinally of the line of travel of the bicycle.

It is customary with many, and perhaps the majority of bicyclists, to so "toe the pedals" as to incline them slightly in the downward direction forwardly in the line of travel of the bicycle and transversely of the pedal treads, throughout the entire cycle of revolution of the pedal. While that inclination is not sufficient to prevent the hereinbefore mentioned circuit-making and breaking rolling of the ball 26 in its runway in the steel block 23 of the flash light body, it may be advisable as a compensation for the "toeing of the pedal," in some instances to clamp the flash light on the outer frame 30 of the pedal at a slight downward inclination to the rear when the pedal frame is in exactly horizontal position. In Fig. 5, 36 indicates the crank with the pedal in its lowermost position and 30 the outer frame of the pedal and 10 the flash light in exactly horizontal position.

As the pedal is revolved about the crank shaft of the bicycle by the rider, the flash-light as a whole also moves in a circular path while remaining substantially horizontal, the effect being a flashing on and off of the front and rear lamp bulbs in alternation by the hereinbefore described circuit-making and breaking rolling movements of the ball 26 in its runway in the steel block 23 in opposite directions into and out of contacts with the negative terminals of the opposed dry cells 20 in alternation, just as in the case of swinging or complete circular movement of the flash light in the hands of a user, as hereinbefore described.

The ball 26 is also so freely and easily movable under the impulses imparted to it by the movements and changing directions of movement of the flash light body as a whole in its cycles of revolution as an attachment to the bicycle pedal as to cause repeated on and off flashings of the front and rear lamp bulbs of the device during each cycle of revolution of the pedal and particularly so at any substantial rate of speed of the bicycle.

Usually the forward lamp bulb or lens will be such as to give a white light and the rear lamp bulb or lens such as to give a red light. There will thus appear, on the bicycle in use at night, a flashing white signal light forwardly and a flashing red signal light rearwardly and with the flashes of each light so frequent during the cycles of revolution of the pedal as to appear to approaching automobilists and other highway travelers as a light oscillating or swinging in a vertical line and thereby apprising them of the identity as a bicycle of the vehicle they are approaching.

When thus attached to the pedal of a bicycle, all that is needed to render the flash light inoperative is to "kick over" the pedal to dispose transverse bore 27 in the steel plug 23 of the device in its lowermost position so that the steel ball 26 will roll into that bore and thereby be restrained from rolling movement into contact with the negative terminal of either of the dry cells 20.

Thus, the operation of the flash light is entirely automatic during the normal drive of the bicycle by the cyclist.

Likewise, the operation of the flash light is entirely automatic during the normal walking and attendant arm-swinging movement of the pedestrian as he carries the flash-light at arm's length in a substantially horizontal position in one hand; and at night, approaching automobilists and other travelers are apprised by the swing of the flashing light that they are approaching a pedestrian on the highway.

In both instances of its use as a hand flashlight and as a pedal-attached flash-light on a bicycle, the flash-light of my invention is, therefore, a very useful safety signalling device.

It is to be understood that in Figs. 4 and 5, the flash-light 10 is shown on a smaller scale than that of the pedal to which it is attached in order to more clearly show just how the flash-light is attached to the pedal and the location of the flash-light with respect to the outer frame member 30 of the pedal. Obviously, within practical limits for efficiency, the flash-light of my invention may be made in differing sizes, both as to longitudinal and transverse dimensions. When manufactured for use as a pedal-attached flashlight, it would ordinarily be of substantially greater longitudinal and transverse dimensions than shown in Figs. 4 and 5 in comparison with the scale of the pedal itself. Preferably, however, the transverse dimension (diameter of the tube or outer casing of the flash-light) would be such as not to extend appreciably beyond the opposite side faces of the treads 29 of the pedal when the flash-light is attached to the outer frame member 30 of the pedal.

I claim:

1. An electric lamp of the flash-light type adapted for use as an attachment on one of the pedals of a bicycle or other pedal-operated vehicle comprising a tube, clamping means for clamping said tube on the pedal of the bicycle in position maintaining the longitudinal axis of said tube in the line of travel of the bicycle and substantially horizontal throughout the cycles of revolution of the pedal in use by the cyclist, a filament lamp bulb mounted in each of the opposite ends of said tube, current supply means in said tube, and a single switch means for making and breaking circuits between said current supply means and said two lamp bulbs in alternation, said means comprising a movable contact element housed wholly within said tube and actuated into different positions making and breaking said circuits for said respective lamp bulbs in alternation by the revolution of said lamp device as a whole when clamped as aforesaid on the pedal of a bicycle and said bicycle is in use.

2. An electric lamp of the flash-light type comprising a one-piece metallic tube of cylindrical cross-section, a filament lamp bulb mounted in each of the opposite ends of said tube, each said lamp bulb having a peripheral terminal in electrical connection and a central terminal out of electrical connection with said tube, two dry cells disposed in axial alignment in said tube with their positive terminals in direct electrical contact with the central terminals of said lamp bulbs and their negative terminals in opposed spaced relation, a metal runway concentric with and in direct electrical contact with the interior wall of said tube between said opposed negative terminals of said cells and insulated from said negative terminals, and a metallic ball freely rollable on a curvilinear surface of said runway into and out of contact with the negative terminals of said opposed cells in alternation.

3. An electric lamp as defined in claim 2 and further characterized by said runway having a transverse bore in one side of its cylindrical wall adapted to receive said ball when said lamp device is bodily positioned to dispose said transverse bore at the bottom of the runway and thereby restrain said ball from said rolling movement along said runway.

4. An electric lamp of the flash-light type comprising a tube having an interior wall portion of electrically conductive material along the length of the tube, a filament lamp bulb mounted in each of the opposite ends of said tube, each said lamp bulb having a peripheral terminal in electrical connection and a central terminal out of electrical connection with said wall portion of said tube, two dry cells disposed in axial alignment in said tube with their positive terminals in direct electrical contact with the central terminals of said lamp bulbs and their negative terminals in opposed relation, a runway of electrically conductive material in direct electrical contact with and extending in parallelism with said interior wall portion of said tube between said opposed negative terminals of said cells and insulated from said negative terminals, and a switch member of electrically conductive material freely rollable along said runway into and out of direct electrical contact with the negative terminals of said opposed cells in alternation.

PAUL H. MacMAHON.

REFERENCES CITED

The following references are of record in the file of this patent:

UNITED STATES PATENTS

| Number | Name | Date |
|---|---|---|
| 1,358,639 | King | Nov. 9, 1920 |
| 1,466,350 | Barany | Aug. 28, 1923 |
| 1,816,065 | Weidman | July 28, 1931 |
| 1,959,835 | Meginniss | May 22, 1934 |
| 2,185,600 | McComb | Jan. 2, 1940 |
| 2,334,442 | Salimbene | Nov. 16, 1943 |

FOREIGN PATENTS

| Number | Country | Date |
|---|---|---|
| 102,426 | Great Britain | Dec. 7, 1916 |